(12) United States Patent
Tuttle

(10) Patent No.: US 7,106,201 B2
(45) Date of Patent: Sep. 12, 2006

(54) COMMUNICATION DEVICES, REMOTE INTELLIGENT COMMUNICATION DEVICES, ELECTRONIC COMMUNICATION DEVICES, METHODS OF FORMING REMOTE INTELLIGENT COMMUNICATION DEVICES AND METHODS OF FORMING A RADIO FREQUENCY IDENTIFICATION DEVICE

(75) Inventor: Mark E. Tuttle, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 09/988,485

(22) Filed: Nov. 20, 2001

(65) Prior Publication Data
US 2002/0075184 A1    Jun. 20, 2002

Related U.S. Application Data

(63) Continuation of application No. 08/926,595, filed on Aug. 20, 1997.

(51) Int. Cl.
    *G08B 13/14*    (2006.01)
(52) U.S. Cl. .............................. 340/572.7; 340/572.8; 235/492; 257/679; 257/787
(58) Field of Classification Search ............. 340/572.1, 340/572.2, 572.7, 572.8
    See application file for complete search history.

(56) References Cited

U.S. PATENT DOCUMENTS

| | | | |
|---|---|---|---|
| 3,573,705 A * | 4/1971 | Magi .......................... 439/101 |
| 4,075,632 A | 2/1978 | Baldwin et al. ............... 342/51 |
| 4,173,019 A * | 10/1979 | Williams ............. 343/700 MS |
| 4,396,917 A * | 8/1983 | Tucker ......................... 342/15 |
| 4,509,053 A * | 4/1985 | Robin et al. ................. 343/708 |
| 4,631,546 A * | 12/1986 | Dumas et al. ............... 343/833 |
| 4,709,201 A | 11/1987 | Schaefer et al. ............ 320/112 |
| 4,751,513 A * | 6/1988 | Daryoush et al. ..... 343/700 MS |
| 4,830,038 A * | 5/1989 | Anderson et al. ........... 136/251 |
| 4,853,705 A * | 8/1989 | Landt .......................... 343/803 |
| 4,857,893 A | 8/1989 | Carroll .................... 340/572.7 |
| 4,866,453 A * | 9/1989 | Nagy et al. ................. 343/712 |
| 4,884,208 A * | 11/1989 | Marinelli et al. ........... 701/300 |
| 4,926,182 A | 5/1990 | Ohta et al. ..................... 342/44 |

(Continued)

OTHER PUBLICATIONS

"Antennas" 2nd Edition, John D. Kraus, McGraw-Hill, Inc. 1988.
U.S. Appl. No. 08/806,158, filed Feb. 25, 1997, Tuttle.

*Primary Examiner*—Benjamin C. Lee
(74) *Attorney, Agent, or Firm*—Wells St. John, P.S.

(57) ABSTRACT

The present invention provides electronic communication devices, methods of forming electrical communication devices, and communications methods. An electronic communication device adapted to receive electronic signals includes: a housing comprising a substrate and an encapsulant; an integrated circuit provided within the housing and comprising transponder circuitry operable to communicate an identification signal responsive to receiving a polling signal; an antenna provided within the housing and being coupled with the transponder circuitry; and a ground plane provided within the housing and being spaced from the antenna and configured to shield some of the electronic signals from the antenna and reflect others of the electronic signals towards the antenna. A method of forming an electronic signal communication device includes providing a substrate having a support surface; providing a conductive layer adjacent at least a portion of the support surface; providing a dielectric layer over the conductive layer; providing an antenna over the dielectric layer; coupling an integrated circuit with the antenna; and encapsulating the antenna, the dielectric layer, and the integrated circuit using a flowable encapsulant.

27 Claims, 4 Drawing Sheets

U.S. PATENT DOCUMENTS

| | | | | |
|---|---|---|---|---|
| 5,020,136 | A * | 5/1991 | Patsiokas et al. | 343/872 |
| 5,030,940 | A * | 7/1991 | Siikarla | 340/572.2 |
| 5,061,943 | A | 10/1991 | Rammos | 343/770 |
| 5,112,253 | A * | 5/1992 | Swift | 439/620 |
| 5,115,223 | A * | 5/1992 | Moody | 340/573.1 |
| 5,138,651 | A | 8/1992 | Sudo | 455/462 |
| 5,144,261 | A * | 9/1992 | Harvey et al. | 331/66 |
| 5,151,946 | A | 9/1992 | Martensson | 455/575.4 |
| 5,170,173 | A | 12/1992 | Krenz et al. | 343/702 |
| 5,252,783 | A * | 10/1993 | Baird | 174/52.2 |
| 5,376,943 | A * | 12/1994 | Blunden et al. | 343/795 |
| 5,392,049 | A | 2/1995 | Gunnarsson | 342/42 |
| 5,400,039 | A | 3/1995 | Araki et al. | 343/700 MS |
| 5,410,749 | A * | 4/1995 | Siwiak et al. | 455/280 |
| 5,414,221 | A * | 5/1995 | Gardner | 174/261 |
| 5,442,367 | A | 8/1995 | Naito et al. | 343/700 MS |
| 5,448,110 | A * | 9/1995 | Tuttle et al. | 257/723 |
| 5,480,842 | A | 1/1996 | Clifton et al. | 438/464 |
| 5,497,168 | A * | 3/1996 | Thomas et al. | 343/834 |
| 5,528,222 | A | 6/1996 | Moskowitz et al. | |
| 5,550,547 | A | 8/1996 | Chan et al. | |
| 5,552,790 | A * | 9/1996 | Gunnarsson | 342/51 |
| 5,569,879 | A * | 10/1996 | Gloton et al. | 174/52.2 |
| 5,621,412 | A | 4/1997 | Sharpe et al. | 340/10.33 |
| 5,642,103 | A | 6/1997 | Tokuda et al. | 340/10.51 |
| 5,649,295 | A | 7/1997 | Shober et al. | 340/10.1 |
| 5,649,296 | A | 7/1997 | MacLellan et al. | 455/39 |
| 5,682,143 | A | 10/1997 | Brady et al. | |
| 5,708,419 | A * | 1/1998 | Isaacson et al. | 340/572.5 |
| 5,735,040 | A * | 4/1998 | Ochi et al. | 29/841 |
| 5,793,305 | A * | 8/1998 | Turner et al. | 340/10.34 |
| 5,815,120 | A * | 9/1998 | Lawrence et al. | 343/702 |
| 5,826,328 | A * | 10/1998 | Brady et al. | 29/827 |
| 5,859,587 | A * | 1/1999 | Alicot et al. | 340/572.8 |
| 5,939,984 | A | 8/1999 | Brady et al. | 340/572.1 |
| 5,963,132 | A * | 10/1999 | Yoakum | 340/572.1 |
| 5,970,393 | A | 10/1999 | Khorrami et al. | |
| 5,988,510 | A | 11/1999 | Tuttle et al. | |
| 5,995,048 | A | 11/1999 | Smithgall et al. | 343/700 MS |
| 6,049,278 | A * | 4/2000 | Guthrie et al. | 340/572.7 |
| 6,118,379 | A | 9/2000 | Kodukula et al. | |
| 6,130,602 | A | 10/2000 | O'Toole et al. | |
| 6,133,836 | A | 10/2000 | Smith | |
| 6,333,693 | B1 | 12/2001 | Smith | |
| 6,339,385 | B1 * | 1/2002 | Tuttle | 340/10.42 |
| 6,359,588 | B1 * | 3/2002 | Kuntzsch | 343/700 MS |
| 6,980,085 | B1 | 12/2005 | Dando | |

* cited by examiner

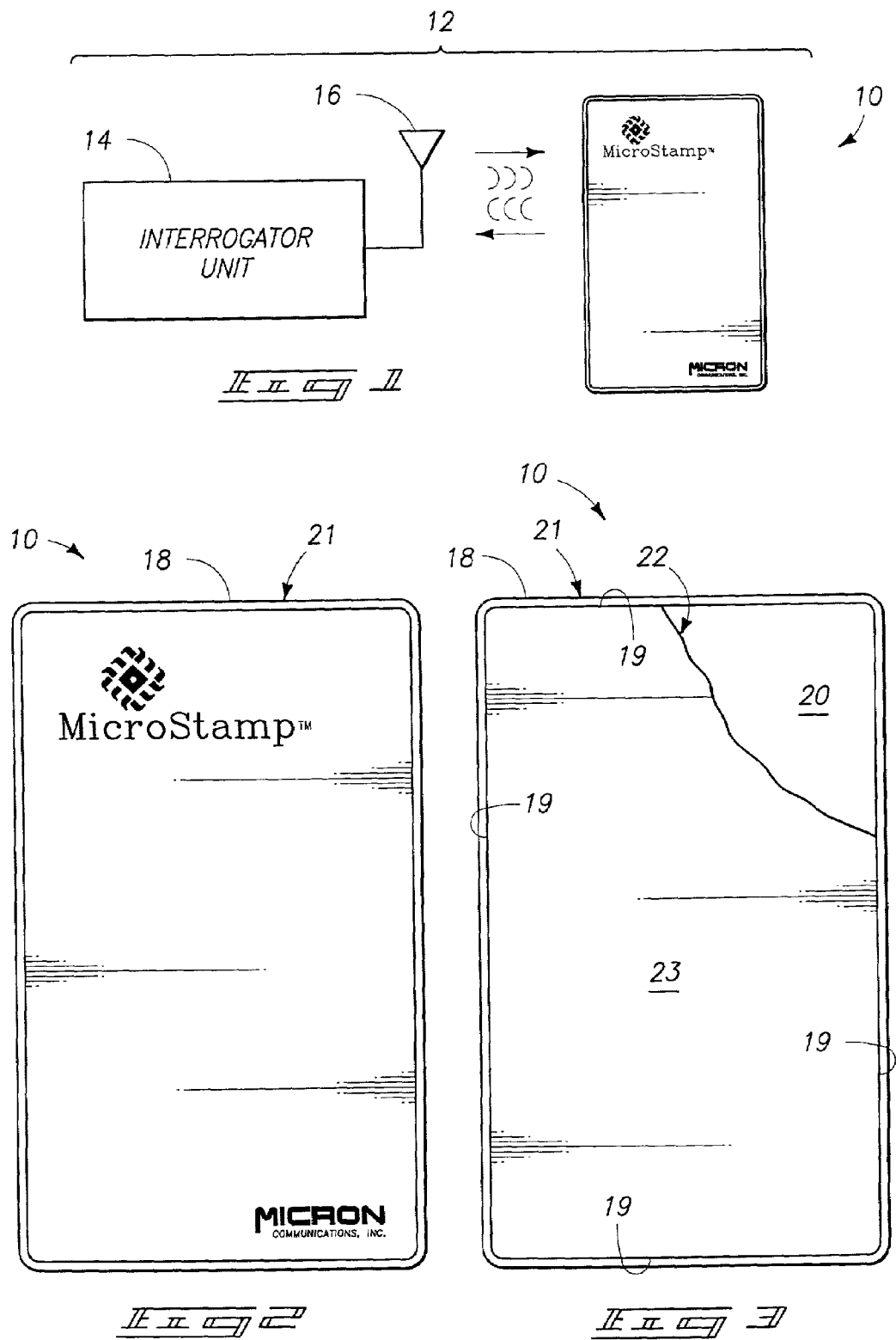

COMMUNICATION DEVICES, REMOTE INTELLIGENT COMMUNICATION DEVICES, ELECTRONIC COMMUNICATION DEVICES, METHODS OF FORMING REMOTE INTELLIGENT COMMUNICATION DEVICES AND METHODS OF FORMING A RADIO FREQUENCY IDENTIFICATION DEVICE

RELATED PATENT DATA

This patent resulted from a continuation of and claims priority to U.S. patent application Ser. No. 08/926,595, filed on Aug. 20, 1997, entitled "Electrical Communication Devices, Methods of Forming Electrical Communication Devices and Communication Methods", naming Mark E. Tuttle as inventory the disclosure of which is incorporated herein by reference.

TECHNICAL FIELD

The present invention relates to electronic communication devices, methods of forming electrical communication devices, and communications methods.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including an interrogator and a transponder such as a tag or card.

The communication system can be used in various identification and other applications. The interrogator is configured to output a polling signal which may comprise a radio frequency signal including a predefined code. The transponders of such a communication system are operable to transmit, reflect or backscatter an identification signal responsive to receiving an appropriate polling signal. More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output the appropriate identification signal. Generating the identification signal identifies the presence or location of the article or object.

Such identification systems configured to communicate via radio frequency signals are susceptible to incident RF radiation. Reflected RF radiation can cause problems in environments having metal structures. For example, application of transponders to objects comprising metal may result in decreased or no performance depending on the spacing of the transponder antenna to the nearest metal on the object.

Therefore, there exists a need to reduce the effects of incident RF radiation upon the operation of communication devices of an electronic identification system.

SUMMARY OF THE INVENTION

According to one embodiment of the invention, an electronic communication device, such as a remote intelligent communication device and a radio frequency identification device, is provided which includes a substrate, conductive layer, at least one antenna and an integrated circuit. The integrated circuit includes at least one of a modulator and receiver. The conductive layer is configured as a ground plane to interact with the antenna. In particular, the ground plane shields some electronic signals from the antenna while reflecting other electronic signals toward the antenna. The conductive layer is preferably coupled with a power source which electrically grounds the conductive layer.

In one aspect of the invention, a radio frequency identification device comprises an integrated circuit including a receiver, a modulator and a processor; an antenna operably coupled with the integrated circuit and configured to at least one of transmit and receive electronic signals; and a conductive layer spaced from and configured to interact with the antenna.

The integrated circuit comprises transponder circuitry in accordance with other aspects of the present invention. The transponder circuitry is configured to output an identification signal responsive to receiving a polling signal from an interrogator.

Additional aspects of the present invention provide methods of forming an electronic signal communication device and a radio frequency identification device. One embodiment provides an encapsulant to form a portion of a housing. Further, the invention provides for methods of operating a radio frequency identification device and methods of communicating including shielding and reflecting electronic signals.

BRIEF DESCRIPTION OF THE DRAWINGS

Preferred embodiments of the invention are described below with reference to the following accompanying drawings.

FIG. 1 is a block diagram of an electronic communication system including an interrogator and an electronic communication device embodying the invention.

FIG. 2 is a front elevational view of the electronic communication device.

FIG. 3 is a rear elevational view of the electronic communication device.

DETAILED DESCRIPTION OF THE PREFERRED EMBODIMENTS

Figure 4:
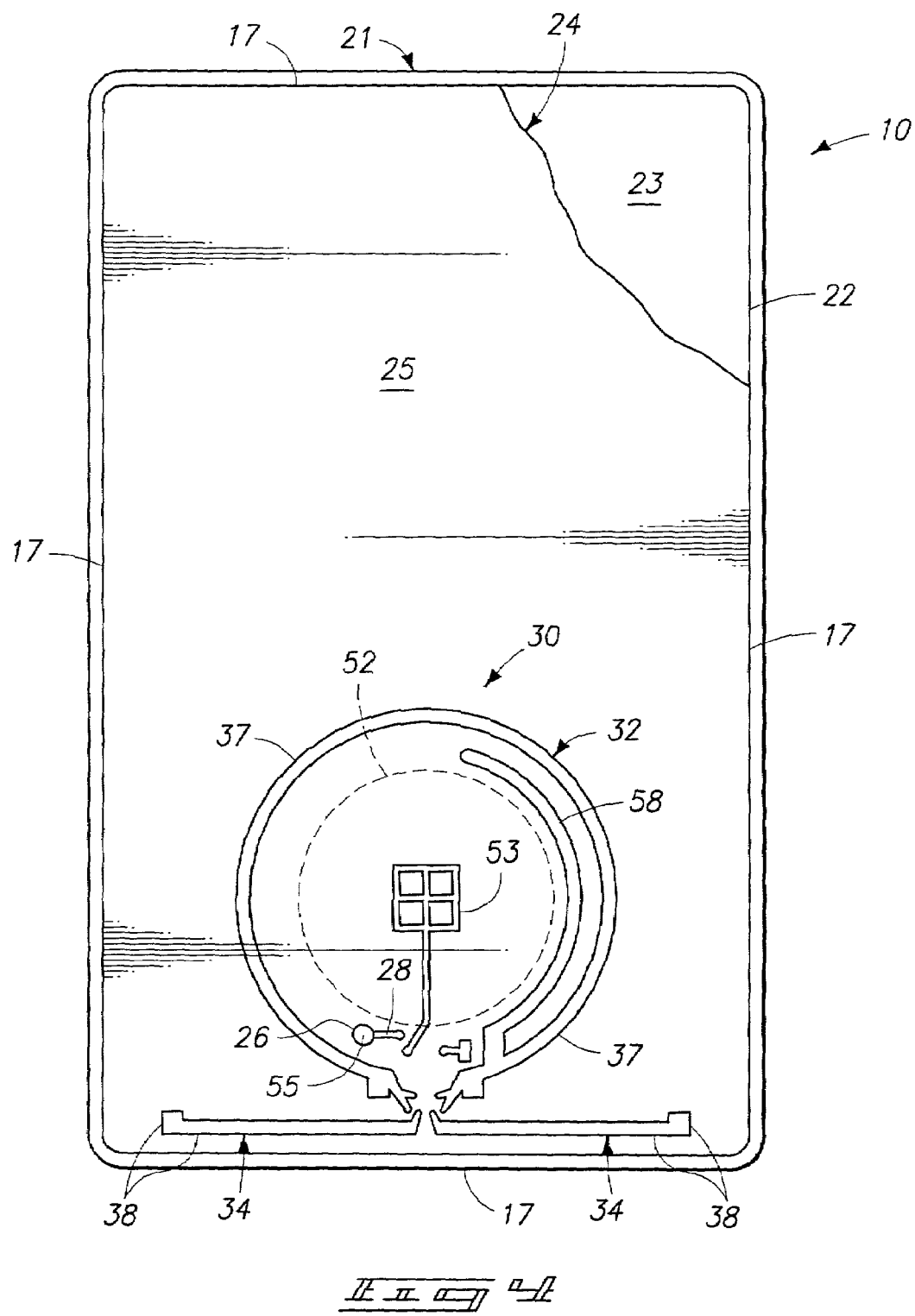
FIG. 4 is a front elevational view of the electronic communication device at an intermediate processing step.

This disclosure of the invention is submitted in furtherance of the constitutional purposes of the U.S. Patent Laws "to promote the progress of science and useful arts" (Article 1, Section 8).

The disclosure of the present invention discloses embodiments of various electronic communication devices. The electronic communication devices are fabricated in card configurations (which include tags or stamps) according to first and second aspects of the present invention. The embodiments are illustrative and other configurations of the electronic communication device according to the present invention are possible. Certain embodiments of the electronic communication devices comprise radio frequency identification devices (RFID) and remote intelligent communication devices (RIC). According to additional aspects of the present invention, methods of forming an electronic communication device and a radio frequency identification device are also provided. The present invention also provides a method of communicating and methods of operating a radio frequency identification device.

Referring to FIG. 1, a remote intelligent communication device or electronic communication device 10 comprises part of a communication system 12. The remote intelligent communication device is capable of functions other than the identifying function of a radio frequency identification device. A preferred embodiment of the remote intelligent communication device includes a processor.

The communication system 12 shown in FIG. 1 further includes an interrogator unit 14. An exemplary interrogator 14 is described in detail in U.S. patent application Ser. No. 08/806,158, filed Feb. 25, 1997, assigned to the assignee of the present application and incorporated herein by reference. The electronic communication device 10 communicates via electronic signals, such as radio frequency (RF) signals, with the interrogator unit 14. Electronic signals or radio frequency signals including microwave signals are utilized for communications in a preferred embodiment of communication system 12.

The communication system 12 further includes an antenna 16 coupled to the interrogator unit 14. An exemplary radio frequency communication system is described in U.S. patent application Ser. No. 08/705,043, which was incorporated above.

Referring to FIG. 2, the electronic communication device 10 includes an insulative substrate or layer of supportive material 18. The term "substrate" as used herein refers to any supporting or supportive structure, including but not limited to, a supportive single layer of material or multiple layer constructions. Example materials for the substrate 18 comprise polyester, polyethylene or polyimide film having a thickness of 4–6 mils (thousandths of an inch). A plurality of ink layers (not shown) are applied to substrate 18 in other embodiments of the invention. Substrate 18 provides an outer periphery 21 of device 10. The substrate 18 defines a first portion of a housing for the electronic communication device 10.

Referring to FIG. 3, substrate 18 includes a support surface 20. A conductive layer 22 is formed or applied over the support surface 20 of substrate 18. Alternatively, conductive layer 22 could be provided directly on substrate 18 by the supplier of such substrate material or applied directly thereon by the manufacturer of the device. In the illustrated embodiment, conductive layer 22 covers the entire support surface 20 providing an electrically conductive upper surface 23. A portion of conductive layer 22 has been peeled away in FIG. 3 to reveal a portion of support surface 20 of substrate 18 therebelow. The illustrated conductive layer 22 defines a plurality of outer peripheral edges 19 adjacent periphery 21.

Alternatively, conductive layer 22 is formed to cover predefined portions of the support surface 20. In the embodiments wherein conductive layer 22 is patterned, the layer is preferably formed adjacent support surface 20 and an antenna formed in subsequent process steps, described in detail below. Example materials for conductive layer 22 include copper, graphite or a conductive polymer. Conductive layer 22 is substantially planar in a preferred embodiment of the invention. A preferred thickness range is from 100 Angstroms to 100 microns.

Referring to FIG. 4, an intermediate processing step following the providing of conductive layer 22 is described. In one embodiment, a dielectric layer 24 having a dielectric surface 25 is provided such as by deposition upon the entire upper surface 23 of conductive layer 22. A portion of dielectric layer 24 has been peeled away in FIG. 4 to reveal a portion of surface 23 of conductive layer 22 therebelow. The illustrated dielectric layer 24 has a plurality of outer peripheral edges 17 adjacent periphery 21. Alternatively, layer 24 comprises a patterned insulating material which covers predefined portions of conductive surface 23 in another embodiment of the invention.

Exemplary thicknesses of dielectric layer 24 are from 100 microns to 30 mils. It is preferred to provide a dielectric layer 24 comprising a material having a low dielectric constant. Therefore, the circuitry including an antenna to be formed over the dielectric layer 24 can be provided spaced far apart from conductive layer 22. An exemplary material of dielectric layer 24 is a self-supporting polyester film similar to substrate 18.

An opening or via 26 is provided through dielectric layer 24, such as by etching. Alternatively, via 26 can be etched or otherwise cut into the polyester film dielectric layer 24 prior to the application thereof to conductive layer 22.

After provision of the conductive layer 22 and dielectric layer 24, a patterned conductive trace 30 is formed or applied over the substrate 18 directly atop the dielectric layer 24 and dielectric surface 25 thereof. A preferred conductive trace 30 comprises silver ink or printed thick film (PTF). One manner of forming or applying the conductive ink is to screen or stencil print the ink on the dielectric layer 24 through conventional screen printing techniques. The conductive ink forms desired electrical connections with and between electronic components which will be described below. In instances where substrate 18 forms a portion of a larger roll of polyester film material, the printing of conductive trace 30 can take place simultaneously for a number of the to-be-formed electronic communication devices.

Conductive trace 30 forms conductive connections 28, 55 in the illustrated embodiment. Connections 28, 55 provide electrical connection of integrated circuitry to and through via 26. The illustrated conductive trace 30 further provides antennas 32, 34 which are suitable for respectively transmitting and receiving electronic signals or RF energy. The illustrated antenna 32 constitutes a loop antenna having outer peripheral edges 37. Antenna 34 comprises outer peripheral edges 38.

Other antenna constructions of antennas 32, 34 are possible. In alternative embodiments of the present invention, only a single antenna such as antenna 32 is provided for both transmit and receive operations. In a preferred embodiment, conductive connections 28, 55 and antennas 32, 34 are formed in a common printing step.

The substrate 18 includes outer periphery 21 inside of which a portion, and preferably the entire antennas 32, 34 extend or lie. In particular, edges 37, 38 of respective antennas 32, 34 are preferably provided within the confines of peripheral edges 19 of conductive layer 22 and peripheral edges 17 of dieletric layer 24. According to one embodiment, antenna 32 has a length within the range of 80 mm–95 mm and is tuned to 2.45 GHz.

Conductive trace 30 additionally includes a plurality of power source terminals, including a first connection terminal 53 and a second connection terminal 58. Connection terminals 53, 58 are formed on dielectric surface 25 of device 10.

Conductive layer 22 can be used to operate as a ground plane and interact with antennas 32, 34. In particular, conductive layer 22 can be used to form a radio frequency (RF) shield. Inasmuch as the preferred embodiment of electronic communication device 10 communicates via wireless signals, it is desired to reduce or minimize interference, such as incident RF radiation. Conductive layer 22 interacts with antenna 32, 34 to improve RF operation.

In one embodiment, conductive layer 22 operates to shield some electronic signals from the antennas 32, 34 and reflect other electronic signals toward the antennas 32, 34. Conductive layer 22 includes a first side, which faces away from antennas 32, 34 (opposite surface 23) and a second side, which faces antenna 32, 34 (same as surface 23). Electronic signals received on the first side of the conductive layer 22 are shielded or blocked by layer 22 from reaching the antennas 32, 34. Electronic signals received on the second side of the conductive layer 22 which pass by or around antennas 32, 34 are reflected by layer 22. Such shielding and reflecting by conductive layer 22 provides a highly directional electronic communication device 10. The providing of conductive layer 22 within electronic communication device 10 results in increased reliability in the wireless communications with interrogator 14.

One embodiment of an electronic communication device 10 provides for a power source 52 (shown in phantom in FIG. 4). The power source 52 is disposed within antenna 32 in one embodiment of electronic communication device 10. A plurality of power source terminals, including first connection terminal 53 and a second connection terminal 58, are formed on dielectric surface 25 in the illustrated device 10.

Figure 5:
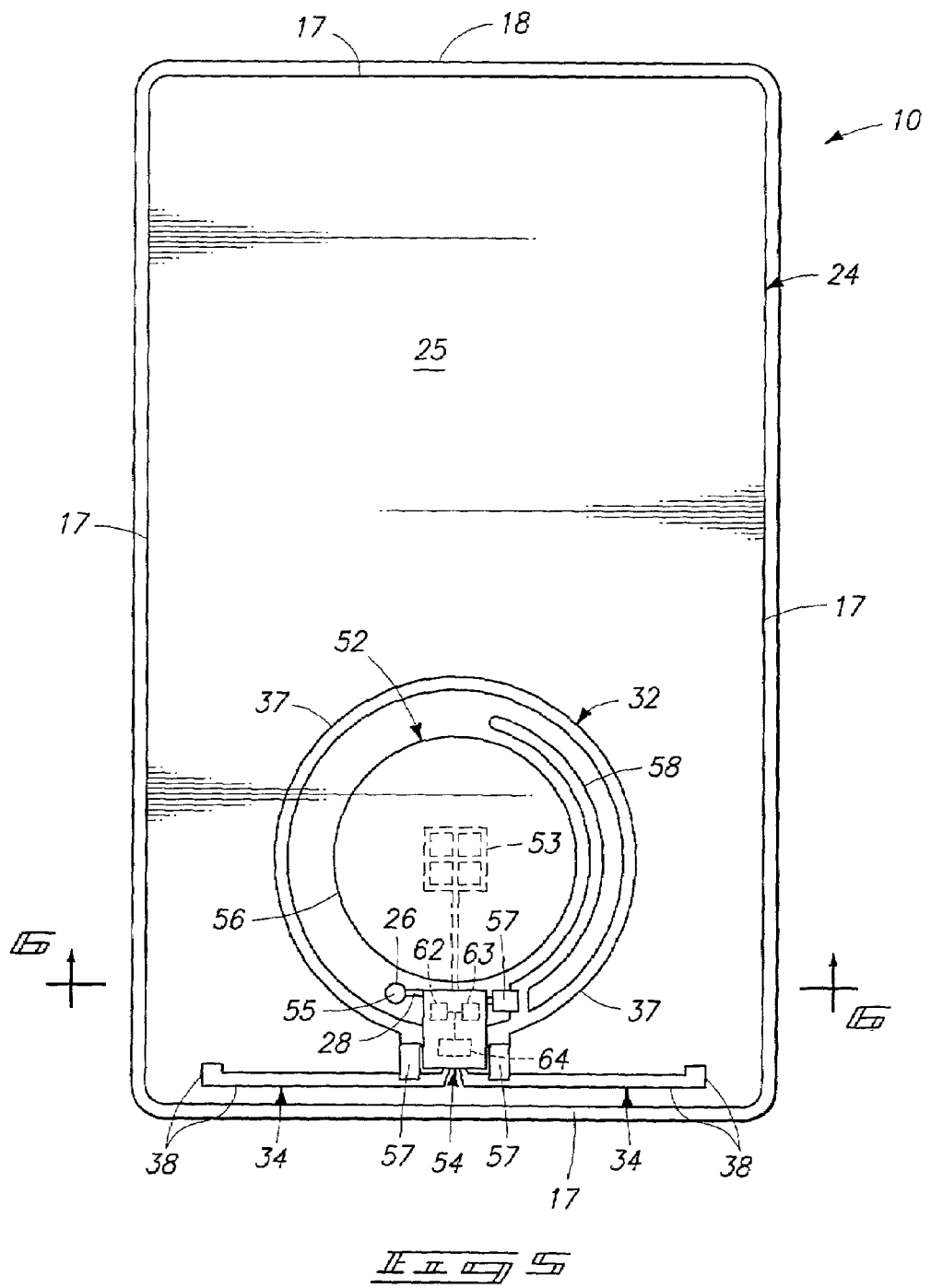
FIG. 5 is a front elevational view of the electronic communication device at an intermediate processing step downstream of the step shown in FIG. 4.
Figure 6:
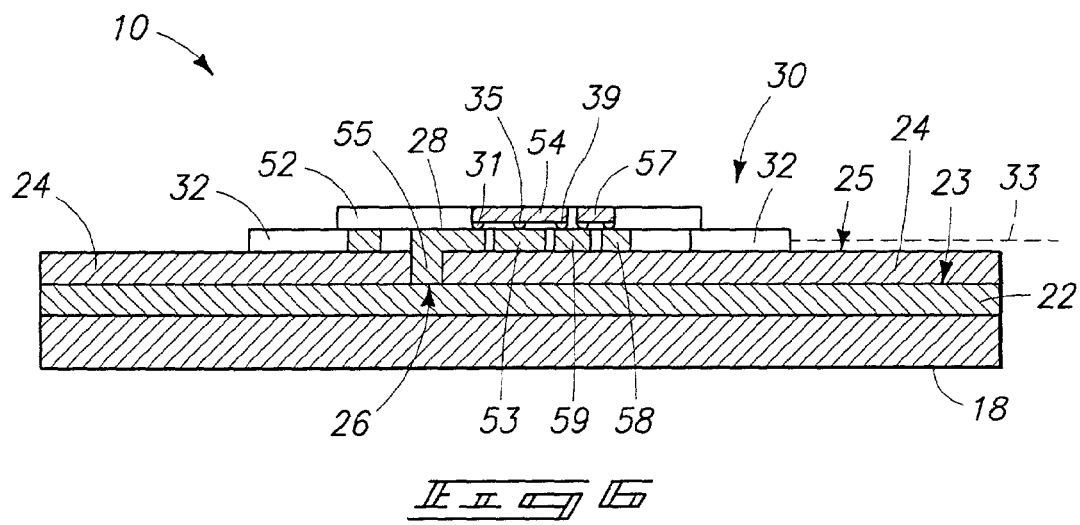
FIG. 6 is cross-sectional view, taken along line 6—6, of the electronic communication device shown in FIG. 5.

Referring to FIGS. 4–6, power source 52 and an integrated circuit 54 are provided and mounted on dielectric surface 25 and supported by substrate 18. Other components including capacitors 57 may also be mounted on surface 25. Power source 52 provides operational power to the electronic communication device 10 and selected components therein, including integrated circuit 54. In the illustrated embodiment, power source 52 is a battery. The battery is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of the dielectric surface 25 using conventional printing techniques, such as stencil printing, to assist in component attachment described just below. Alternately, solder or another conductive material is employed instead of conductive epoxy. The power source 52 is provided and mounted on dielectric surface 25 using the conductive epoxy. Integrated circuit 54 is also provided and mounted or conductively bonded on the dielectric surface 25 using the conductive epoxy. Integrated circuit 54 can be mounted either before or after the power source 52 is mounted on the dielectric surface 25.

Integrated circuit 54 includes suitable circuitry for an electronic communication device 10. For example, in one embodiment, the integrated circuit 54 includes a processor 62, memory 63, and transponder circuitry 64 for providing wireless communications with interrogator unit 14. An exemplary and preferred integrated circuitry package 54 is described in U.S. patent application Ser. No. 08/705,043 incorporated by reference above.

Transponder circuitry 64 includes a modulator and a receiver. The receiver is configured to receive electronic signals and the modulator is configured to output or communicate electronic signals. The modulator comprises an active transmitter or a backscatter device according to certain embodiments of the present invention. Such outputting or communicating of the electronic signal via the modulator comprises one of transmitting the electronic signal and reflecting a received signal in the described embodiments.

When configured as an active transmitter, the modulator of transponder circuitry 64 is operable to transmit an electronic signal such as a identification signal responsive to the receiver receiving a polling signal. Processor 62 is configured to process the polling signal to detect a predefined code within the polling signal. Responsive to detection of an appropriate polling signal, processor 62 instructs transponder circuitry 64 to output or communicate an identification signal. The identification signal contains an appropriate code to identify the particular device 10 transmitting the identification signal.

Alternatively, when embodied as a backscatter device, the modulator of transponder circuitry 64 operates to selectively reflect a received electronic signal following processing of the signal within processor 62. The reflected signal also serves to identify the particular device 10 communicating the reflected signal.

First and second connection terminals 53, 58 are coupled to the integrated circuit 54 by conductive epoxy in accordance with a preferred embodiment of the invention. The conductive epoxy also electrically connects the first terminal of the power source 52 to the first connection terminal 53 (shown in phantom in FIG. 5). In the illustrated embodiment, power source 52 is placed lid down such that the conductive epoxy makes electrical contact between the negative terminal of the power source 52 and the first connection terminal 53.

Power source 52 has a perimetral edge 56, defining the second power source terminal, which is disposed adjacent second connection terminal 58. In the illustrated embodiment, perimetral edge 56 of the power source 52 is cylindrical, and the connection terminal 58 is arcuate and has a radius slightly greater than the radius of the power source 52, so that connection terminal 58 is closely spaced apart from the edge 56 of power source 52.

Subsequently, conductive epoxy is dispensed relative to perimetral edge 56 and electrically connects perimetral edge 56 with connection terminal 58. In the illustrated embodiment, perimetral edge 56 defines the can of the power source 52, such that the conductive epoxy connects the positive terminal of the power source 52 to connection terminal 58. The conductive epoxy is then cured.

Referring specifically to FIG. 6, first connection terminal 53 is shown coupled with a first pin 35 of integrated circuit 54. Antenna 32 is additionally coupled with integrated circuit 54 providing electrical connection for the transfer of signals corresponding to the wireless signals or RF energy transmitted and received by antenna 32. The illustrated capacitor 57 is shown coupled with connection terminal 58 and the integrated circuit 54 via a connection 59.

Antenna 32 defines a plane 33 which is substantially parallel to conductive layer 22 in the embodiment of electronic communication device 10 shown in FIG. 6. Although not shown in FIG. 6, antenna 34 may also define a plane substantially parallel to conductive layer 22.

The illustrated integrated circuit 54 is shown electrically coupled with the conductive layer 22. Connection 28 provides electrical connection of integrated circuit 54 and via 26. Conductive connection 55 provided within via 26 provides electrical connection through via 26 to conductive layer 22. Connections 28, 55 operate to conductively bond integrated circuit 54 and conductive layer 22 through pin 31.

The conductive bonding of integrated circuit 54 with conductive connections 28, 55 and antennas 32, 34 is provided in a single processing step in accordance with the preferred embodiment of the present invention.

In one embodiment, conductive layer 22 is electrically coupled with the ground (i.e., negative) terminal of power source 52 through the integrated circuit 54. In particular, the ground terminal of power source 52 is coupled with the $V_{ss}$ node of integrated circuit 54 via connection terminal 53. The conductive layer 22 is electrically coupled with the $V_{ss}$ node and the negative terminal of power source 52 via conductive connection 28, 55 and third pin 31 of integrated circuit 54. It follows that a common reference voltage is established within integrated circuit 54 and conductive layer 22. In an alternative embodiment (not shown), conductive layer 22 is coupled directly with the ground electrode of the power source 52.

Further alternatively, no electrical connection is made to ground plane/conductive layer 22. In such an embodiment, ground plane/conductive layer 22 is insulated and the voltage of layer 22 is permitted to float.

Figure 7:
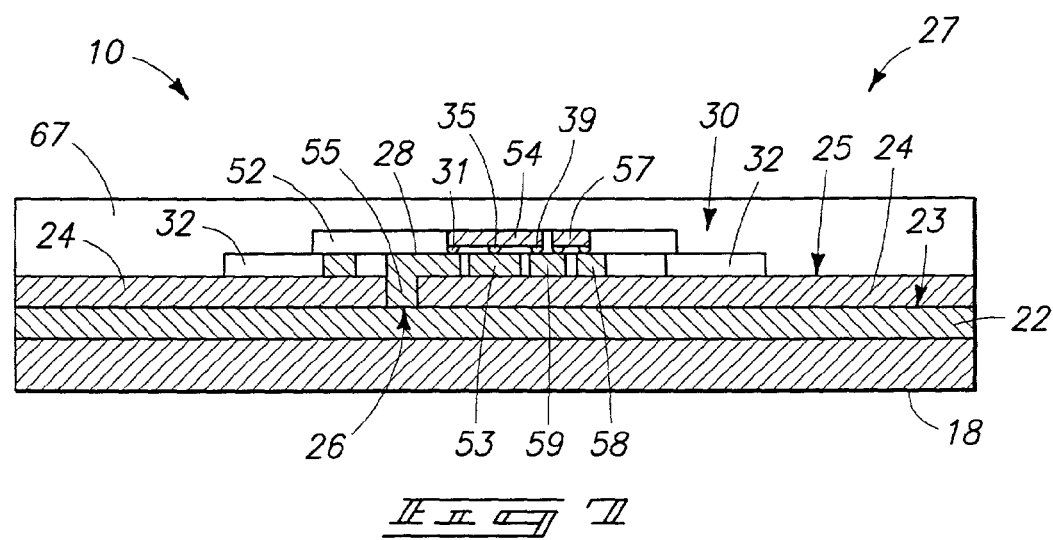
FIG. 7 is a cross-sectional view, similar to FIG. 6, showing a housing of the electronic communication device.

Referring to FIG. 7, an encapsulant, such as encapsulating epoxy material 67, is subsequently formed to encapsulate the substrate 18 to cover the integrated circuit 54, power source 52, conductive circuitry 30, and a portion of the dielectric layer 24, and to define a portion of a housing 27 for the electronic communication device 10. Housing 27 also comprises substrate 18 in addition to the encapsulating epoxy material 67. In one embodiment, housing 27 of electronic communication device 10 has a width of about 3.375 inches, a height of about 2.125 inches, and a thickness less than or equal to about 0.090 inch.

An exemplary encapsulant is a flowable encapsulant. The flowable encapsulant is subsequently cured following the appropriate covering of the integrated circuit 54, power source 52, conductive circuitry 30, and the dielectric layer 24, forming a substantially void-free housing or solid mass. In the illustrated embodiment, such epoxy 67 constitutes a two-part epoxy having a resin and a hardener which are sufficient to provide a desired degree of flexible rigidity. Such encapsulation of electronic communication device 10 is described in U.S. patent application Ser. No. 08/800,037, filed Feb. 13, 1997, assigned to the assignee of the present application, and incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A remote intelligent communication device comprising:
   a ground plane;
   an antenna spaced apart from and interacting with the ground plane, the antenna being substantially electrically insulated from the ground plane;
   transponder circuitry coupled with the antenna;
   an encapsulant configured to form a housing about the antenna and the transponder circuitry, the encapsulant comprising an outermost planar surface of the housing; and
   a power source electrically connected with the transponder circuitry and the ground plane.

2. The device according to claim 1 wherein the encapsulant encapsulates and contacts the antenna.

3. The device according to claim 1 wherein the encapsulant encapsulates and contacts the transponder circuitry.

4. The device according to claim 1 wherein the transponder circuitry comprises radio frequency identification device communication circuitry.

5. The device according to claim 1 wherein the transponder circuitry includes a modulator configured to communicate using backscatter communications.

6. The device according to claim 1 further comprising an integrated circuit comprising the transponder circuitry.

7. A communication device comprising:
   transponder circuitry operable to communicate an identification signal using backscatter communications responsive to receiving a polling signal;
   an antenna coupled with the transponder circuitry; and
   a ground plane spaced from the antenna and configured to shield some electromagnetic signals from the antenna and reflect other electromagnetic signals towards the antenna, the ground plane being electrically coupled with a terminal of a power source and provided at a voltage of the terminal.

8. The device according to claim 7 wherein the ground plane has a first side facing away from the antenna and configured to shield the some electromagnetic signals from the antenna, and a second side facing the antenna and configured to reflect the other electromagnetic signals towards the antenna.

9. The device according to claim 8 wherein the transponder circuitry is configured to implement radio frequency identification device communications.

10. The device according to claim 7 further comprising the power source coupled with the transponder circuitry.

11. The device according to claim 7 further comprising an integrated circuit comprising the transponder circuitry.

12. A method of forming a remote intelligent communication device comprising:
   providing a power source;
   forming a ground plane;
   forming an antenna spaced from the ground plane;
   conductively bonding transponder circuitry with the antenna; and
   electrically coupling the ground plane with the power source to electrically ground the ground plane.

13. The method of claim 12 further comprising conductively bonding the transponder circuitry with the ground plane.

14. The method of claim 12 further comprising forming a housing to encapsulate and contact the antenna and the transponder circuitry.

15. The method of claim 12 wherein the conductively bonding comprises conductively bonding the transponder circuitry configured to implement backscatter communications.

16. The method of claim 12 wherein the antenna comprises a trace of electrically conductive ink.

17. The method of claim 12 further comprising providing an integrated circuit comprising the transponder circuitry.

18. A method of forming a remote intelligent communication device comprising:

forming a ground plane;

printing an antenna over the ground plane in a substantially electrically insulated relationship with respect to the ground plane;

forming a housing to encapsulate and contact the antenna;

electrically coupling transponder circuitry with the antenna;

providing a dielectric layer intermediate the ground plane and the antenna; and printing at least one conductive connection through the dielectric layer while printing the antenna.

19. The method of claim 18 wherein the forming the housing comprises forming the housing to contact a portion of the dielectric layer.

20. The method of claim 18 wherein the electrically coupling comprises electrically coupling the transponder circuitry configured to implement backscatter communications.

21. The method of claim 18 wherein the printing the antenna comprises printing a trace of electrically conductive ink.

22. The method of claim 18 further comprising providing an integrated circuit comprising the transponder circuitry.

23. A method of forming a radio frequency identification device comprising:

providing a conductive layer;

forming an antenna over the conductive layer;

providing transponder circuitry over the conductive layer, wherein the transponder circuitry is configured to communicate using radio frequency identification device communications to identify the radio frequency identification device;

electrically coupling the transponder circuitry with the antenna;

providing an encapsulant to form the device comprising a substantially void-free mass; and grounding the conductive layer during communications of the transponder circuitry.

24. The method of claim 23 wherein the encapsulating comprises:

flowing a flowable encapsulant over the antenna and the transponder circuitry; and curing the encapsulant.

25. The method of claim 24 wherein the flowing the flowable encapsulant comprises flowing the flowable encapsulant over an entirety of the antenna.

26. The method of claim 23 further comprising providing an integrated circuit comprising the transponder circuitry.

27. The method of claim 23 wherein the providing the encapsulant comprises providing the encapsulant to form the device comprising a solid device which is a void-free mass.

\* \* \* \* \*

UNITED STATES PATENT AND TRADEMARK OFFICE
CERTIFICATE OF CORRECTION

PATENT NO. : 7,106,201 B2  Page 1 of 1
APPLICATION NO. : 09/988485
DATED : September 12, 2006
INVENTOR(S) : Tuttle It is certified that error appears in the above-identified patent and that said Letters Patent is hereby corrected as shown below:

Col. 8, line 46, claim 9, please delete "claim 8" after "according to" and insert --claim 7--.

Signed and Sealed this

Fourth Day of December, 2007

JON W. DUDAS
*Director of the United States Patent and Trademark Office*